US012429361B2

(12) United States Patent
Besnard

(10) Patent No.: US 12,429,361 B2
(45) Date of Patent: Sep. 30, 2025

(54) INCREMENTAL MAGNETIC ENCODER

(71) Applicant: THALES, Courbevoie (FR)

(72) Inventor: Mathieu Besnard, Merignac (FR)

(73) Assignee: THALES, Courbevoie (FR)

(*) Notice: Subject to any disclaimer, the term of this patent is extended or adjusted under 35 U.S.C. 154(b) by 237 days.

(21) Appl. No.: 18/318,191

(22) Filed: May 16, 2023

(65) Prior Publication Data

US 2023/0375370 A1 Nov. 23, 2023

(30) Foreign Application Priority Data

May 17, 2022 (FR) .................................. 22 04669

(51) Int. Cl.
*G01D 5/14* (2006.01)
(52) U.S. Cl.
CPC ...................................... *G01D 5/14* (2013.01)
(58) Field of Classification Search
CPC ........................................................ G01D 5/14
See application file for complete search history.

(56) References Cited

U.S. PATENT DOCUMENTS

| 4,199,741 | A | 4/1980 | Serrus Paulet |
| 8,004,277 | B2* | 8/2011 | Patil .................. B62D 15/0245 324/207.25 |
| 8,610,051 | B2 | 12/2013 | Bigand et al. |
| 9,322,671 | B2* | 4/2016 | Servel .................... F16H 59/70 |
| 2004/0100440 | A1 | 5/2004 | Levin et al. |
| 2011/0215230 | A1 | 9/2011 | Bigand et al. |
| 2012/0126102 | A1 | 5/2012 | Bigand |
| 2013/0245992 | A1* | 9/2013 | Servel .................... G01D 5/145 324/207.2 |
| 2019/0086238 | A1* | 3/2019 | Moriyama ............ F16C 41/007 |
| 2022/0021289 | A1 | 1/2022 | Alzingre et al. |
| 2022/0300026 | A1 | 9/2022 | Alzingre et al. |

FOREIGN PATENT DOCUMENTS

FR 3 062 935 8/2018

OTHER PUBLICATIONS

Preliminary Search Report for FR 2204669 dated Dec. 5, 2022.

* cited by examiner

*Primary Examiner* — Walter L Lindsay, Jr.
*Assistant Examiner* — Milton Gonzalez
(74) *Attorney, Agent, or Firm* — B. Aaron Schulman, Esq.; Stites & Harbison, PLLC

(57) ABSTRACT

An incremental magnetic encoder is provided which defines an encoder axis and which as a fixed body and a body movable with respect to the fixed body along at least a first direction of encoding. One of the bodies, called first body, has a first ring extending along a first longitudinal direction coinciding with an encoder axis and a first circumferential direction perpendicular to the first longitudinal direction, and defining a magnetic alternation along the first direction of encoding. The other body, called second body, has at least one first notching tooth made of ferromagnetic or magnetic material arranged opposite the first ring, and a first pair of magnetic sensors arranged opposite the first ring and configured for quantifying each movement of the movable body along the first direction of encoding.

16 Claims, 16 Drawing Sheets

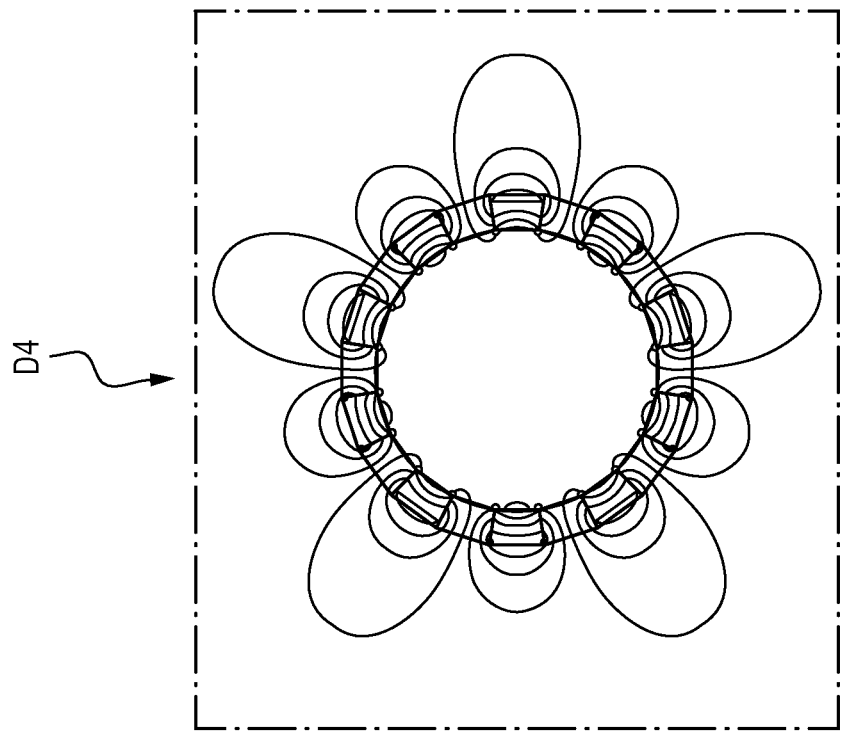
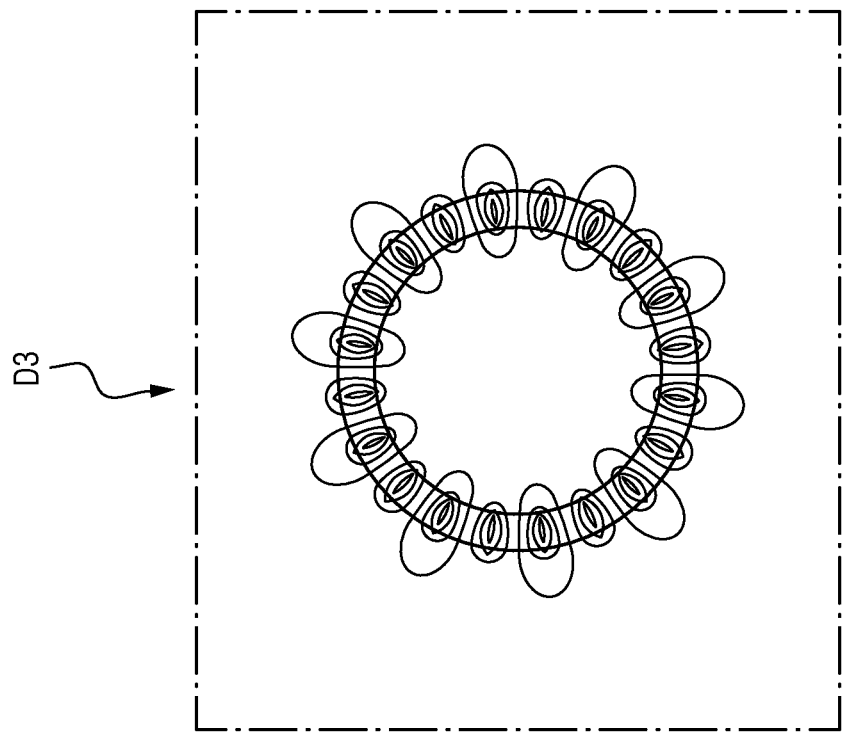
FIG.8

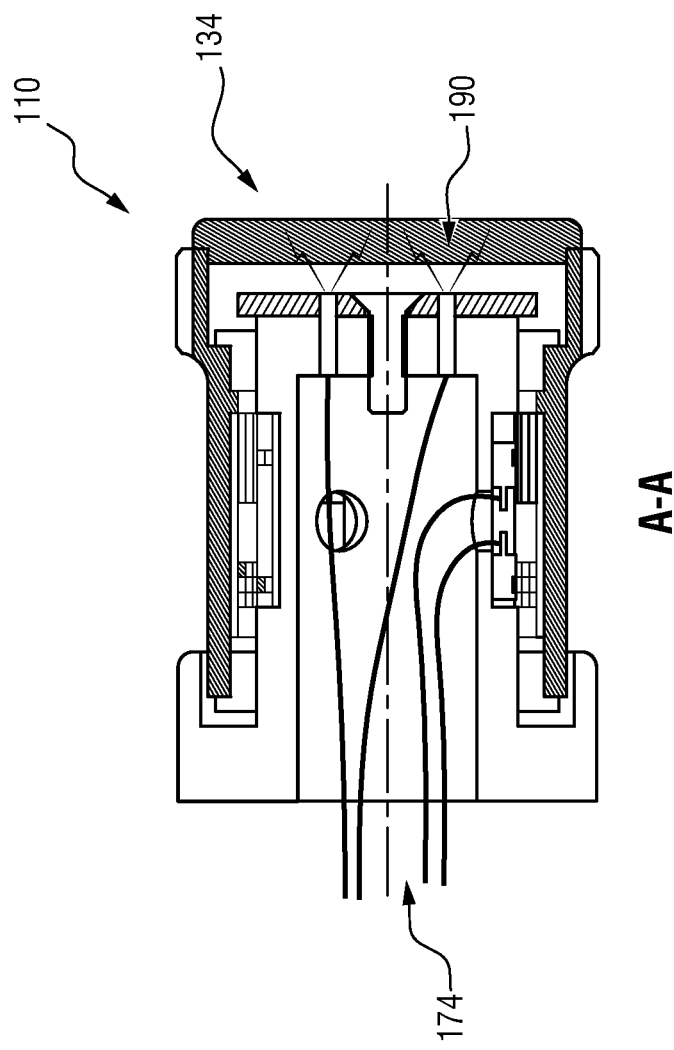
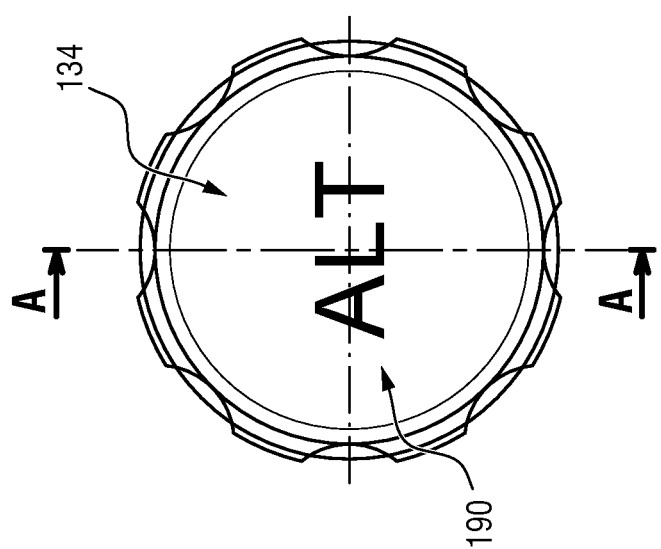
FIG.16

INCREMENTAL MAGNETIC ENCODER

FIELD OF THE INVENTION

The present invention relates to an incremental magnetic encoder.

More particularly, the present invention relates to an encoder apt to supply binary logic signals representing increments of relative position of two elements of the encoder, the two elements being movable with respect to each other. Advantageously, such an encoder can be used in the aeronautical field, e.g. in an aircraft cockpit.

BACKGROUND OF THE INVENTION

Typically, in an application for aeronautical equipment, it is possible to use an angular and/or linear encoder to indicate to an automatic pilot computer an altitude or speed setpoint the operator chooses by actuating a control button of the encoder. The reliability of the encoder and the information the encoder delivers is then an essential element of the encoder. The typical requirement for an aeronautical encoder can comprise one or a plurality of the following elements: compactness, ability to perform multi-turns in rotation and/or linear travel, incrementing and notching ability, etc. To be certified, the aeronautical encoder should also be able to meet high DALs (Design Assurance Level), particularly the DAL A.

More particularly, with regard to compactness, an encoder typically has a control button with a diameter between 10 and 100 mm and a length between 5 and 50 mm (typically Ø16 mm×lg 16 mm) and a body with a diameter between 10 and 100 mm and a length between 5 and 100 mm (typically Ø25 mm×lg 50 mm) hidden behind the attachment panel or attached in front of said panel. In the latter case, the button includes the encoder body which is attached to the panel and makes it possible to be placed around or slightly overlapping a monitor or a screen.

With regard to incrementing capacity, each switching by a notch (or pitch) is an increment of one unit of counting the rotation or the translation. The angular or linear resolution is defined by the pitch (or notch). The number of pitches per revolution is on the order of 1 to 32 pitches (typically 12 pitches). The number of pitches in translation is from 1 to 10 notches (typically 1 notch in each direction for obtaining a push/pull button with a stable state between the two notches).

To detect the direction of the movement in rotation and/or translation, the encoder generally has at least two detectors (for rotation and for translation, respectively) physically offset from each other (typically an odd number of quarter pitches). The two detectors can be used for the encoding of the movement in rotation and/or translation, over two bits. Thus, the encoding gives the following successive values: 00, 01, 11, 10 when the encoder rotates and/or translates in one direction and the following successive values: 00, 10, 11, 01 when the encoder rotates and/or translates in the other direction. It is thus possible to determine not only the appearance of an increment in rotation and/or translation (change of state of one of the bits) but also the direction of rotation (by comparison between a detected state and the immediately preceding state).

With regard to the notching ability of the encoders, the switching of an encoded notch usually results in tactile feedback that an operator should feel when handling the device. The angular notching torque can be e.g. on the order of 1 to 700 mN·m (typically 12 mN·m) and the linear notching force on the order of 0.5 to 20 N (typically 6 N).

The most complex encoders have rotational and translational encoding and notching. The rotational encoding and notching should not be blocked by the translational encoding and notching. In such case, rotational and translational detection and notching should be able to be used simultaneously without any loss of performance. E.g., for entering a speed, the pilot will have to simultaneously push the encoder button and turn the button to the chosen value.

Finally, in certain cases, to secure the encoder and in particular to guarantee the DAL (e.g. DAL A) thereof, the detection (or encoding) functions are at least doubled.

To meet the above-mentioned needs, the encoders used in aeronautical applications are often based on opto-mechanical (optical detection and mechanical notching) or electro-mechanical (detection by electrical contact and mechanical notching) and sometimes magneto-mechanical (magnetic detection and mechanical notching) or opto-magnetic or even purely magnetic solutions.

E.g., opto-mechanical encoders are described in the documents FR 2937129 and FR 2954491. According to said documents, the rotational and/or translational detection (encoding) is performed by an optical encoder while maintaining in a stable position (notching) is ensured mechanically by at least one ball pressurized by a spring on a ball race (or cam). Even if such latest innovations meet the needs described above and aim to simplify the production thereof, the opto-mechanical and electromechanical encoders remain complex assemblies consisting of numerous high-precision parts.

More generally, current mechanical notching solutions generate friction (example: ball against cam) and wear, which limits the service life of the device, especially when plastic parts are used. In electromechanical encoders, detection and notching are sometimes linked by at least one common mechanical part which serves both for the click and the detection via an electrical contact. The latter is often exposed to the risk of wear, of "fretting corrosion" and limits the service life of the device. In addition, in opto-mechanical and sometimes electromechanical devices, the detection and the notching are uncoupled, i.e. same result from different solutions and/or phenomena and are quite distant physically. Such uncoupling increases the number of parts and consequently the risk of misalignment between detection and notching. In the case of complex and secure encoders, the number of parts is even greater. In such case, to ensure good performance and reliability, the current complex encoders require high precision parts which are more expensive.

Document FR 2370350 is also known, which describes a rotary magnetic encoder with movable magnets wherein the notching and the encoding result from the magnetic phenomenon. However, the encoder of said document is only rotary and uses moving magnets which are exposed to risks of friction and jamming.

In summary, electromechanical solutions present the highest risk of fatigue both in terms of notching and encoding because such solutions generate the most friction. Moreover, electrical encoding is exposed to fretting corrosion. Such drawbacks reduce the reliability and limit the lifetime of the device.

The opto-mechanical and magneto-mechanical solutions retain the risk of fatigue at the mechanical notching.

Opto-magnetic solutions use different contactless phenomena. Such solutions are more bulky if it is desired to make a more complex encoder (e.g.: rotary encoder with "push/pull") and secure.

Finally, purely magnetic solutions do not meet all of the above-mentioned needs.

SUMMARY OF THE INVENTION

The goal of the present invention is to propose an incremental encoder satisfying all the aforementioned needs (compactness, ability to perform multi-turns in rotation and/or a linear travel, incrementing and notching ability, etc.), while having notching and detection functions (encoding) with no friction and no wear, a limited number of parts, simplified assembly and reduced risk of jamming and shifting.

To this end, the invention relates to an incremental magnetic encoder defining an encoder axis and comprising a fixed body and a movable body movable with respect to the fixed body along at least a first direction of encoding.

One of the bodies, called first body, comprises a first ring extending along a first longitudinal direction coinciding with the encoder axis and a first circumferential direction perpendicular to the first longitudinal direction, one of said first directions corresponding to the first direction of encoding, the first ring defining a magnetic alternation along the first direction of encoding.

The other body, called second body, comprises:
- at least one first notching tooth made of ferromagnetic or magnetic material arranged opposite the first ring so as to create a notching during a movement of the movable body along the first direction of encoding.
- a first pair of magnetic detectors arranged opposite the first ring and configured for quantifying each movement of the movable body along the first direction of encoding.

Provided with such characteristics, the encoder according to the invention can be used for implementing an encoding along one of the chosen directions, e.g. amongst the translation direction and the rotation direction, while ensuring notching along the same direction. According to the invention, the encoding and the notching are created by the same magnetic effect between the movable body and the fixed body.

Thereby, the arrangement of the two bodies can be chosen so as to minimize the mechanical contact. E.g., the elements detailed hereinabove of the fixed body and of the movable body have no contact with each other. Thereby, such elements work without friction and without premature mechanical wear. The above guarantees the reliability of the use of the encoder and considerably extends the service life thereof even when plastic parts are used. Moreover, such elements are limited in number, which makes it possible to arrange same easily within the corresponding bodies.

The above makes the mounting of the button particularly easy and reduces the risks of jamming and of shifting of different parts from one another.

According to certain embodiments of the invention, the movable body is further movable with respect to the fixed body along a second direction of encoding perpendicular to the first direction of encoding.

According to certain embodiments, the first body further comprises a second ring extending along a second longitudinal direction coinciding with the encoder axis and a second circumferential direction perpendicular to the second longitudinal direction, one of said second directions corresponding to the second direction of encoding, the second ring defining a magnetic alternation along the second direction of encoding.

The second body comprises:
- at least one second notching tooth made of ferromagnetic or magnetic material arranged opposite the second ring so as to create a notching during a movement of the movable body along the second direction of encoding;
- a second pair of magnetic detectors arranged opposite the second ring and configured for quantifying each movement of the movable body along the second direction of encoding.

Due to such features, it is possible to implement the encoding and the notching by the magnetic encoder according to the invention, along two different directions of encoding. Thereby, it is possible e.g. to implement the encoding and the notching simultaneously along the direction of rotation and translation. Such an application corresponds in particular to a conventional application of an encoder in the cockpit of an aircraft.

Moreover, the encoding and the notching along the two aforementioned directions are implemented using the same physical phenomenon, namely magnetism, which makes it possible to prevent contacts and thus frictions between different parts and, hence, the premature wear thereof. Thereby, the aforementioned advantages with respect to a single direction of encoding can be applied equally to both directions of encoding.

According to further other embodiments, the encoder according to the invention has more than two directions of encodings and, advantageously, directions of notching.

According to certain embodiments, the notching teeth are rigidly connected to each other by a connecting piece, advantageously made of a ferromagnetic or magnetic material.

Such features improve the efficiency of the encoder. In particular, the above increases the torque and the notching force without increasing the size of the notching teeth. Thereby, it is possible to prevent leaks of the magnetic field and external spurious emissions.

In certain embodiments, the first direction of encoding corresponds to a translation along the encoder axis according to a predetermined translational travel length and the second direction of encoding corresponds to rotation about the encoder axis.

Provided with such features, the encoder according to the invention can be used in a conventional manner in the cockpit of an aircraft.

According to certain embodiments, the longitudinal extent of the second ring is chosen so that the magnetic field seen by the or each second notching tooth and by the second pair of magnetic detectors is substantially constant over the entire length of travel in translation.

According to such features, the magnetic field seen by the or each tooth associated with the rotation ring and by the pair of corresponding detectors is substantially constant at a given angle of rotation and over the entire length of travel in translation of the encoder denoted by Ct. If each second notching tooth is centered on the corresponding ring, then the length Ct is equal to twice the travel length along each direction. As a consequence, rotational and translational detection and notching can be used simultaneously without any loss of performance for the encoder.

In general, the following formula has to be satisfied: $L2 \geq Ldr + Ct$ where $L2$ is the longitudinal extent of the second ring and $Ldr$ is the longitudinal extent of the or each second notching tooth. If the longitudinal extent of the first and second notching teeth are substantially equal, the longitudinal extent of the second ring is substantially greater than the longitudinal extent of the first ring. Indeed, if we consider that L1≈Ldt+Ct (Ldt denoting the longitudinal extent of the or each first notching tooth) and Ldt=Ldr, then L2≥L1.

According to certain embodiments, the first ring defines at least one central notch and two peripheral notches and a position which is stable in translation, being defined when the first notching tooth is arranged opposite the central notch.

Due to such features, it is possible to achieve push/pull functions along the translation direction of the encoder according to the invention. More particularly, such features can be used for having a stable position when the notching tooth associated with the translation ring is positioned opposite the central notch. Such a stable position is reached without using mechanical means of return, such as springs or other elastic elements. Thereby, it is possible to avoid spurious friction during the operation of the encoder.

It is thus possible for the operator to press on the encoder or to pull the encoder, while allowing the operator to enter information by rotating in one of the aforementioned positions of the encoder.

According to certain embodiments, the magnetic alternation of the or of each ring defines a constant notching pitch.

Provided with such features, the or each ring can be manufactured in a simple manner. In addition, the above creates homogeneous notches throughout the movement of the encoder along the corresponding direction.

According to certain embodiments of the invention, the surface of the or of each notching tooth has an extent less than or equal to the notching pitch of the corresponding ring.

Provided with such features, the number of teeth can thereby be increased until reaching the number of magnetic alternations of the rings. In this way it is possible to optimize the notching force.

In certain embodiments, the magnetic detectors of the same pair of detectors are offset from each other by a fraction of the notch pitch of the corresponding ring.

Due to such features, it is possible to detect the direction of movement of the encoder along the corresponding direction of encoding. E.g., for the direction of rotation, such an arrangement of the detectors is used for detecting the direction of rotation of the encoder. For the direction of translation, such an arrangement of the detectors is used for detecting the translational direction of movement of the encoder.

According to certain embodiments, the second body comprises, for at least one ring, a plurality of notching teeth made of ferromagnetic or magnetic material arranged opposite the ring in order to create a notching during a movement of the movable body along the corresponding direction of encoding;

advantageously, said notching teeth are distributed equidistantly along the corresponding circumferential direction.

A plurality of notching teeth associated with the same can be used for increasing the notching force and/or torque. It is thereby possible to reach the desired torque during the notching. Moreover, when the teeth are distributed equidistantly, it is possible to make the force and/or the torque homogeneous during each notching.

According to some embodiments, further comprising a travel stop for the or each direction of encoding.

Provided with such features, it is possible to ensure a stop according to the or each direction of encoding of the encoder.

In certain embodiments, the first body is the movable body and the second body is the fixed body.

The or each ring is present in the movable body whereas the or each tooth and the or each pair of magnetic sensors are present in the fixed body. The above is advantageous insofar as the electrical cables coming in particular from the magnetic detector stay fixed. The above avoids complicated wiring which is usually expensive and carries risks of wear and of signal interruption.

According to certain embodiments, the fixed body is intended for being attached in front of a panel forming an instrument panel and the fixed body is at least partially sheathed by the movable body.

Due to such features, the encoder according to the invention can be attached in a particularly simple manner, e.g. on an instrument panel of the cockpit of an aircraft.

According to certain embodiments, the fixed body is intended for being attached behind a panel forming an instrument panel and the fixed body at least partially sheathes the movable body.

Due to such features, the encoder according to the invention can be arranged in a compact manner, e.g., in the cockpit of an aircraft because only the movable part protrudes with respect to the panel forming the instrument panel.

According to certain embodiments, further comprising a button intended for being oriented towards an operator;
the button comprising at least one functional element selected from the list comprising:
an element of visual feedback;
a presence sensor;
a haptic actuator.

Due to such features, it is possible to provide a number of additional functions of the encoder. E.g. it is possible to implement a visual feedback indicating e.g. to the operator the current state of the encoder or any other useful information, such as e.g. the function assigned to the encoder.

By means of to the presence sensor, it is possible e.g. to activate additional functions of the encoder by detecting the position of the fingers on the button. E.g., the functions of the encoder could differ depending on the number of fingers on the button.

By means of a haptic actuator, it is possible to improve the haptic feeling felt by the user.

According to certain embodiments of the invention, the encoder further comprises a supplementary notching controller comprising an electromagnetic coil rigidly attached to one of the bodies and configured for acting on at least one notching tooth and/or on a ferromagnetic or magnetic element rigidly attached to the other body.

Due to such features, it is possible to increase the notching force and torque felt by the operator.

BRIEF DESCRIPTION OF FIGURES

The features and advantages of the invention will appear upon reading the following description, given only as an example, but not limited to, and making reference to the enclosed drawings, wherein:

FIG. 8 is a magnetic radiation pattern according to different examples of layout of the elements forming the rotation ring shown in FIG. 7;

FIG. 16 shows a partial view of a section along the longitudinal plane XVI of the encoder shown in FIG. 12 and another section along the encoder axis shown in FIG. 12, the encoder comprising at least one additional functional element.

DETAILED DESCRIPTION OF THE INVENTION

First Embodiment

Figure 1:
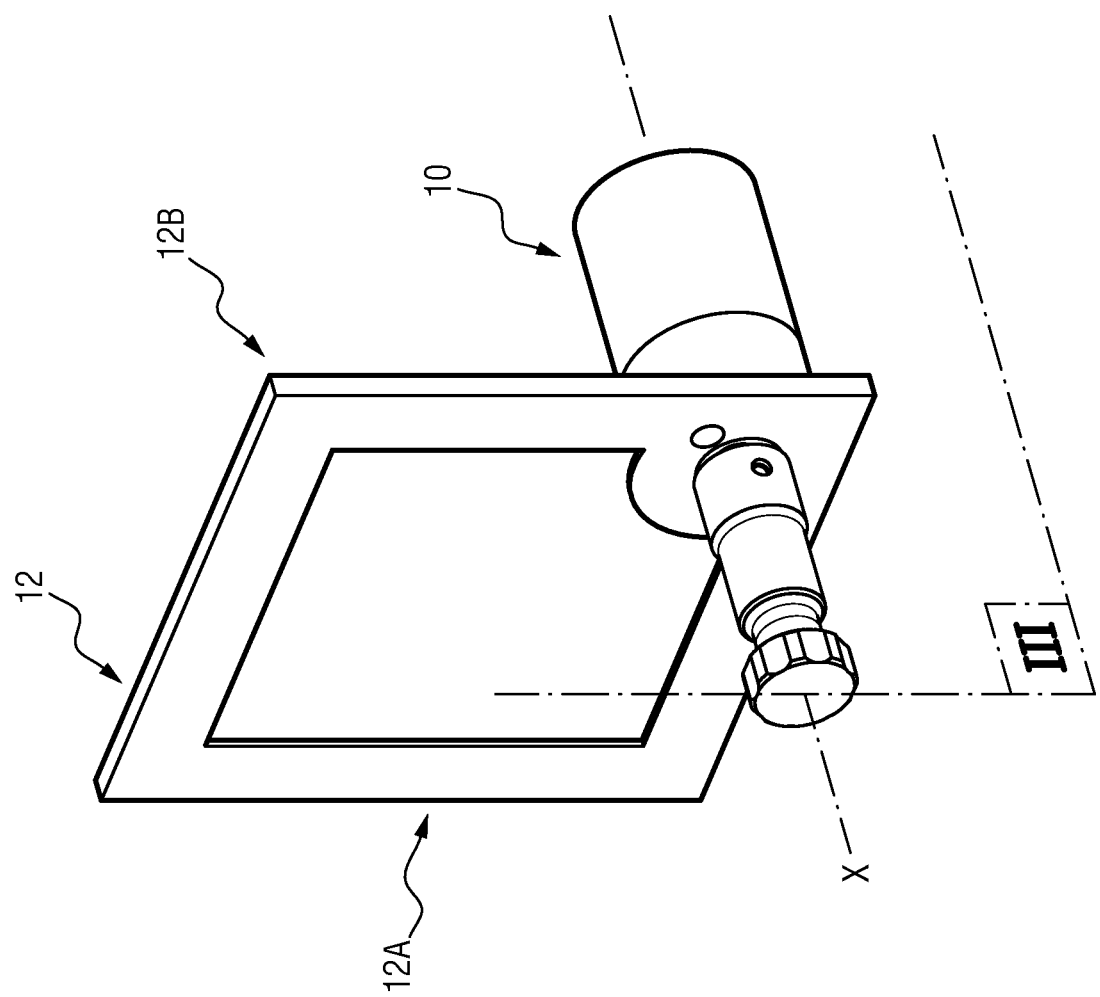
FIG. 1 is a schematic perspective view of a magnetic encoder according to a first embodiment of the invention, the encoder being partially attached behind a panel forming an instrument panel.

FIG. 1 shows an incremental magnetic encoder 10 according to a first embodiment of the invention. Preferentially, the encoder 10 is mounted in a cockpit used for piloting an aircraft.

"Aircraft" means any flying device, such as e.g. an airplane, a helicopter or a drone. Such an aircraft can be piloted directly from the cockpit. In such a case, the cockpit is advantageously arranged inside the aircraft. According to another example of embodiment, such an aircraft is controlled remotely. In such a case, the cockpit is arranged at a distance from the aircraft and has e.g. a ground station. In any case, the aircraft is configured for being piloted by an operator, e.g. by a pilot, from the cockpit located inside the aircraft.

According to the invention, the encoder 10 is used by the operator for controlling at least one avionic function. E.g, such an encoder 10 can be used by the operator for controlling an avionic system and forms part of a control system of such an avionic system. In a variant, the encoder 10 is part of a control system for a plurality of avionic systems. E.g. the encoder 10 according to the invention is part of a system called "Flight Control Unit" (FCU) or "Integrated Standby Instrument System" (ISIS) or "Closer Control Device" (CCD) or "Keyboard Cursor Control Device" (KCCD), etc.

In the example shown in FIG. 1, the encoder 10 is partially integrated into the panel 12. The panel 12 forms e.g. an instrument panel of the cockpit of the aircraft for one of the aforementioned control systems. In the example shown in FIG. 1, the encoder 10 is arranged partially in the front part 12A of the panel 12 and partially in the rear part 12B of the panel 12. More particularly, in the example shown in FIG. 1, the front part 12A of the panel 12 is oriented towards the operator while the rear part 12B of the panel is oriented towards the inner part of the instrument panel. Of course, other examples of arrangement of the encoder 10 with respect to the panel 12 or with respect to any other means of attachment are possible as well.

Figure 2:
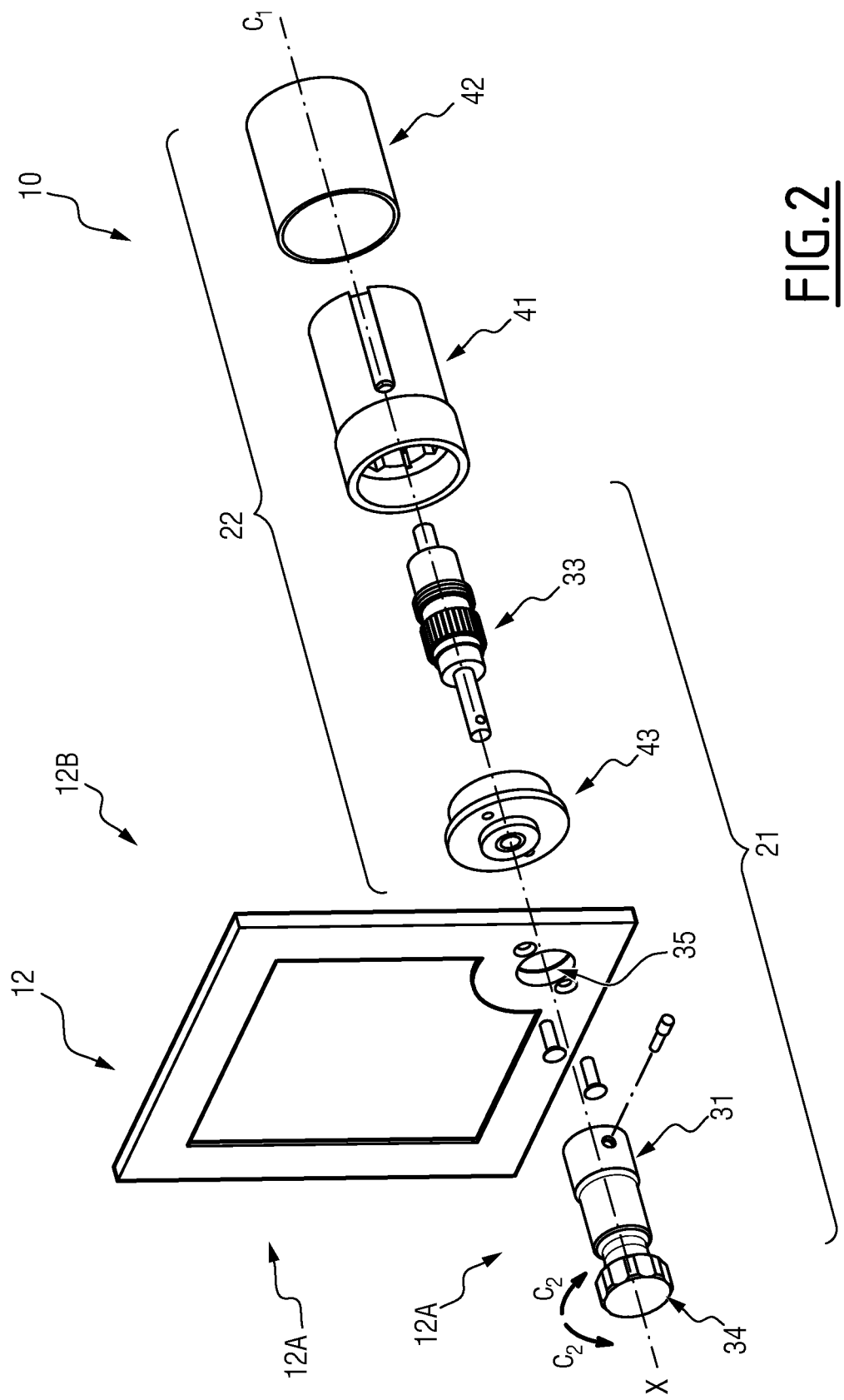
FIG. 2 is an exploded perspective view of the encoder shown in FIG. 1.

With reference to FIG. 2, the encoder 10 comprises a movable body 21, also called, in the example shown in the figure, first body, and a fixed body 22, also called, in the example shown in the figure, second body.

The movable body 21 comprises a button 31 and a rotor 33.

The button 31 protrudes with respect to the panel 12 and is arranged in the front part 12A of the panel 12. The button 31 is movable in translation along an encoder axis X and in rotation about the encoder axis X. In particular, the button 31 is movable along a first direction of encoding C1 which corresponds in the present example to the direction of translation along the encoder axis X and a second direction of encoding C2 which corresponds in the present example to the direction of rotation about the encoder axis X. Advantageously, the button 31 is movable in each direction along each direction of encoding C1, C2. In particular, in the direction of rotation, the button 31 is movable in rotation clockwise and anti-clockwise and, along the direction of translation, the button 31 is movable in the direction towards the instrument panel and towards the operator. Advantageously, the button 31 defines in particular a button surface 34 which is intended for being oriented towards the operator. The surface 34 thus represents an external surface of the button 31 which is visible to the operator and can be grabbed by the operator.

The rotor 33 extends along the encoder axis X so as to form on one of the ends thereof, a linkage rigidly attached to the button 31. Thereby, just like the button 31, the rotor 33 is movable along the first direction of encoding C1 and along the second direction of encoding C2, in each aforementioned direction of movement. The rotor 33 receives functional internal elements of the movable body 21 which will be explained thereafter in greater detail.

The fixed body 22 comprises a support 41, a cover 42 and a flange 43.

The flange 43 is e.g. arranged in a through hole 35 of the panel 12 and supports the button 31 and the rotor 33. In the example shown in FIG. 2, the flange 43 is attached to the panel 12 while remaining in the rear part 12B of the latter, e.g. by using screws accessible from the front part 12A of the panel 12.

The support 41 receives functional internal elements of the fixed body 22 which are intended for cooperating with the functional internal elements of the movable body 21 as will be explained thereafter in greater detail. More particularly, and as will be apparent thereafter, the functional internal elements of the fixed body 22 are held by the support 41 at a distance from same of the movable body 21. To this end, the support 41 is configured for receiving at least partially the rotor 33 with the functional internal elements of the movable body 21 borne by the rotor 33.

Figure 3:
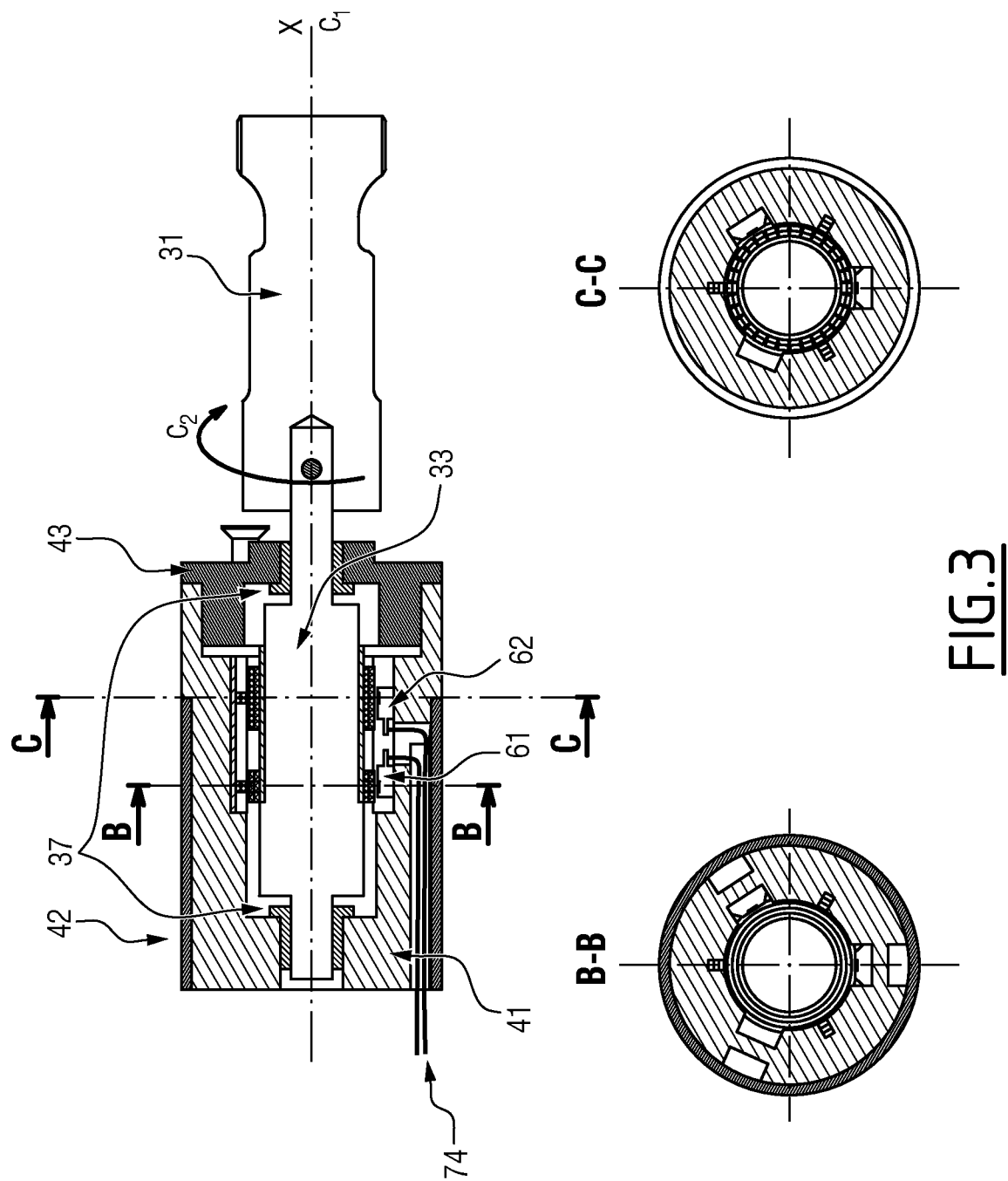
FIG. 3 shows a partial view of a section along the longitudinal plane III of FIG. 1 and of three other sections along the encoder axis shown in FIG. 1.

The support 41 is e.g. linked to the movable body 21 via a link movable along each direction of encoding. Such link can e.g. be formed at each end of the rotor 33 and have plain bearings, e.g. polymer bearings or sintered bronze bearings. Such bearings are preferentially flanged in order to serve as a mechanical stop. According to another example, the bearings are rolling element bearings such as ball bushings. FIG. 3 shows in particular the bearings 37 linking the rotor 33 to the second body 22. In the example shown in said figure, the bearings 37 link one end of the rotor 33 directly to the support 41 and the other end of the rotor 33 to the support 41 via the flange 43. In said example, the flange 43 is configured for cooperating with the support 41 in order to attach the support to the panel 12

The cover 42 is intended for protecting all the components of the encoder 10 which are arranged in the rear part 12B of the panel 12.

Figure 4:
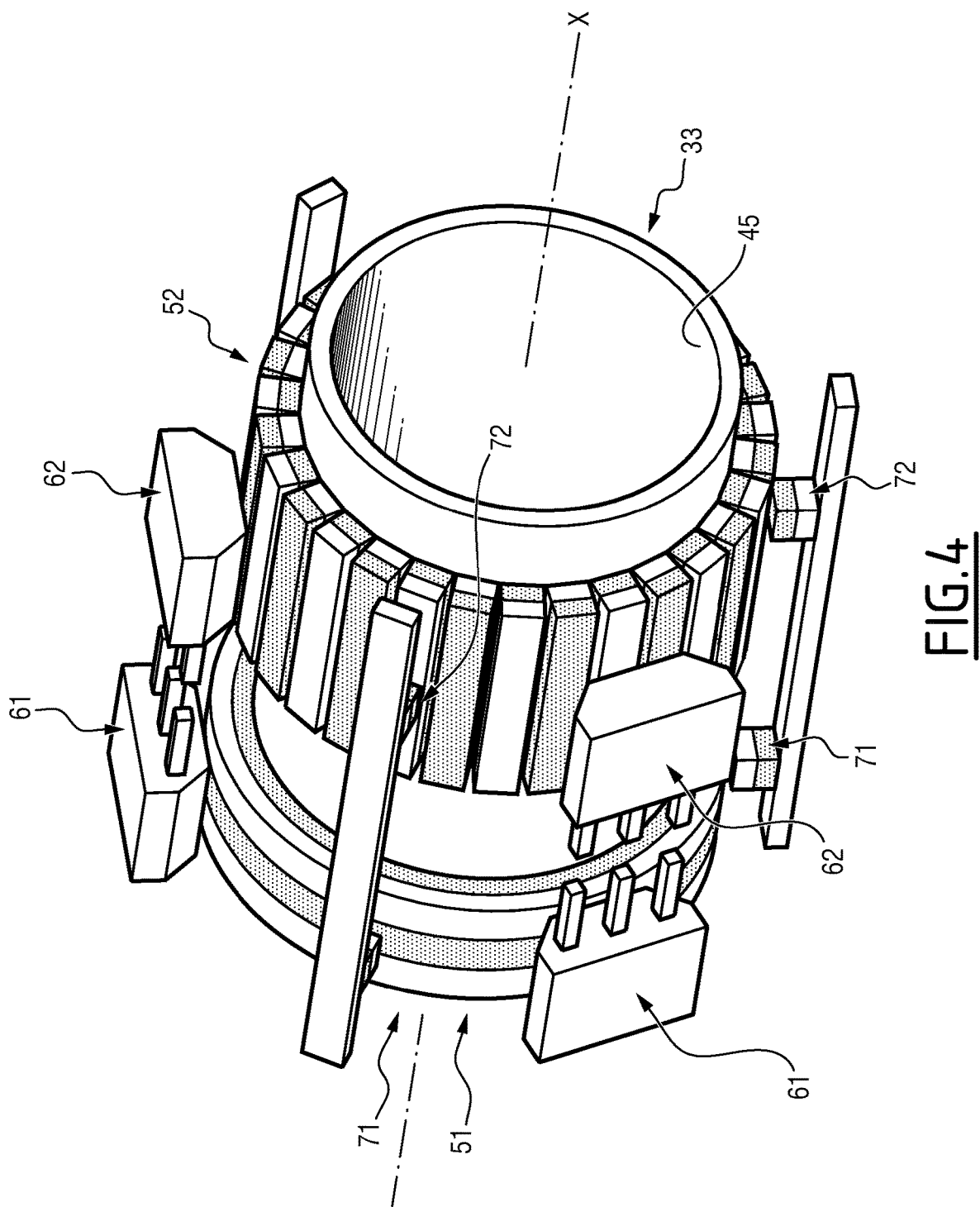
FIG. 4 is a perspective view of the functional internal elements of the fixed body and of the movable body shown in FIG. 1, said elements comprising in particular a translation ring, a rotation ring, a plurality of notching teeth and two pairs of magnetic detectors.

In the example shown in FIG. 4 illustrating in greater detail the functional internal elements of the fixed body 22 and of the movable body 21, the rotor 33 has e.g. a hollow shaft 45 with a cylindrical shape extending along the encoder axis X.

With reference to the FIG. 4, the functional internal elements of the movable body 21 comprise a first ring 51, called translation ring, and a second ring 52, called rotation ring. Each of the rings 51, 52 is attached on the shaft 45 along the encoder axis X and stays spaced from the other ring 51, 52. Furthermore, each of the rings 51, 52 has an axial magnetic alternation in the case of the translation ring 51 and a circumferential magnetic alternation in the case of the rotation ring 52.

Figure 5:
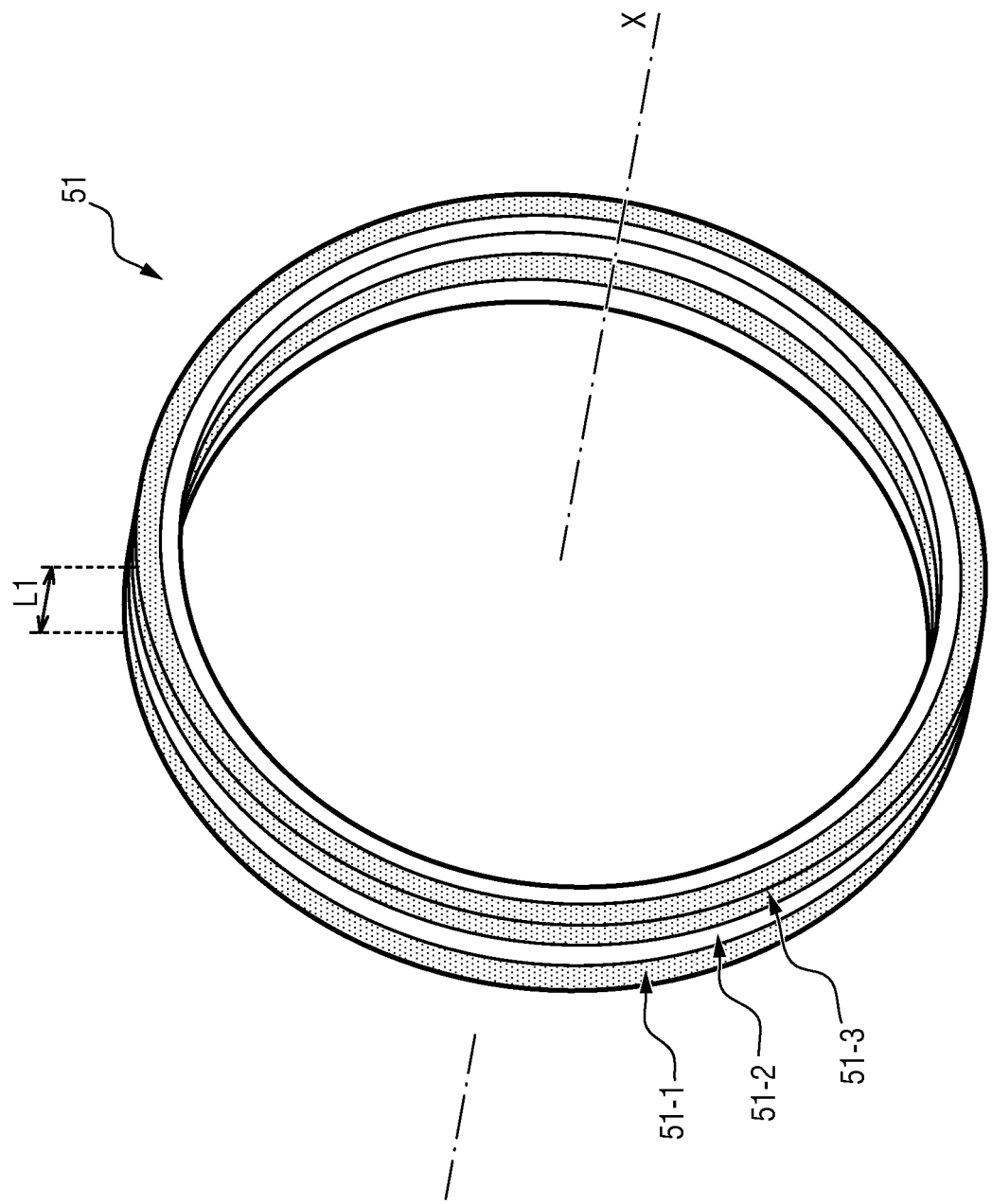
FIG. 5 is a schematic perspective view of the translation ring shown in FIG. 4.

FIG. 5 illustrates the translation ring 51 in greater detail. Thereby, with reference to the FIG. 5, the translation ring 51 extends along the encoder axis X and has a plurality of elementary rings 51-1, 51-2, 51-3 arranged side by side, e.g. by bonding Each elementary ring 51-1, 51-2, 51-3 is e.g. made of a single block or from a plurality of parallelepiped magnets or magnets in the shape of an arc of a circle. Such an elementary magnet can e.g. come from a "polymagnet" or from a "programmable magnet" called Polymagnets®.

In order to achieve an axial magnetic alternation, in the example shown in FIG. 5, the elementary rings 51-1, 51-2, 51-3 have a radial magnetization and are arranged side by side so that the adjacent rings are magnetized in opposite directions along the radial direction. Such layout of the elementary parts forms a pattern D1 of the magnetic fluxes illustrated in FIG. 6 in the case of five elementary parts.

Figure 6:
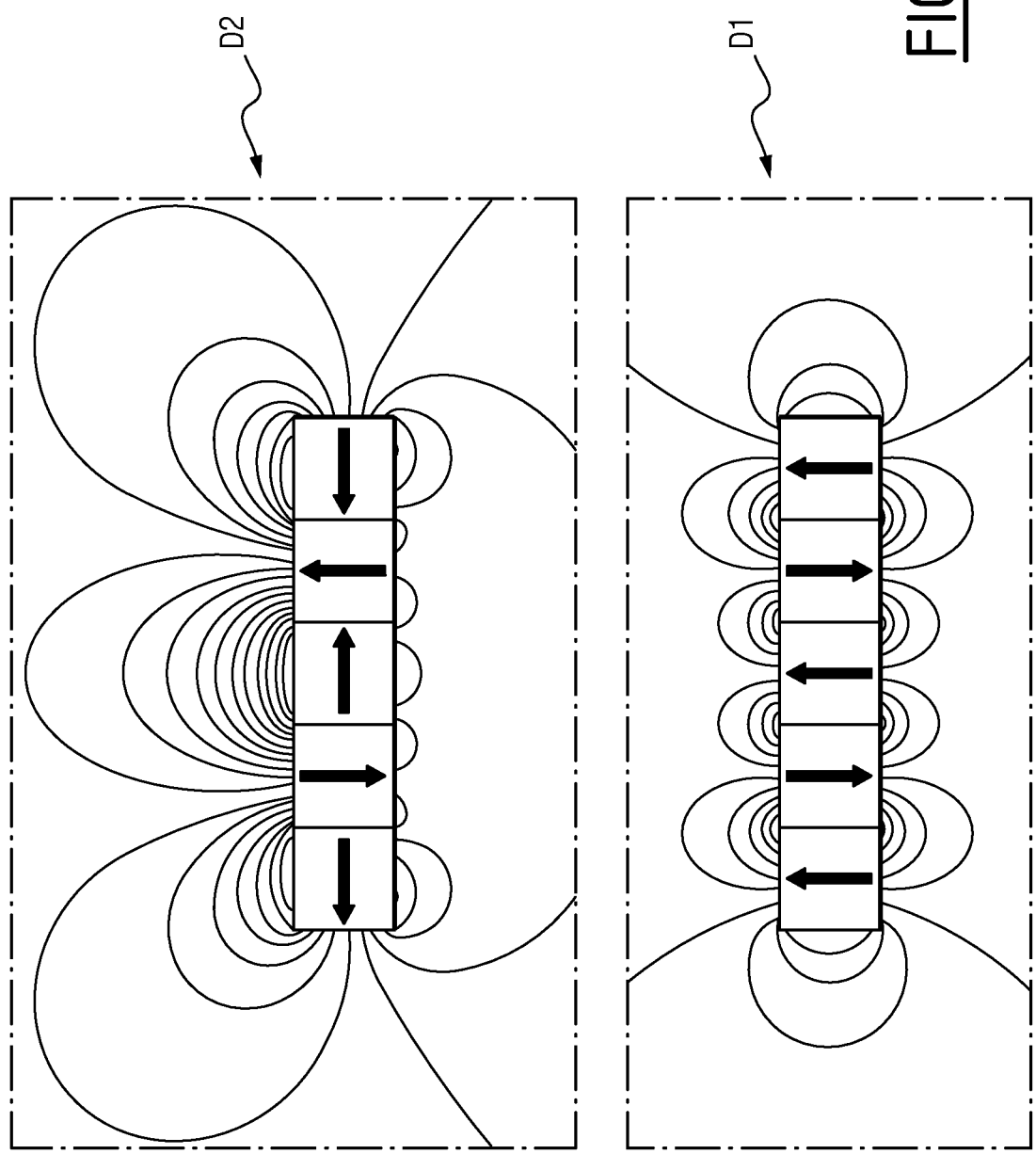
FIG. 6 is a magnetic radiation pattern according to different examples of layout of the elementary rings of the translation ring shown in FIG. 5.

According to another example of possible arrangement, an axial magnetic alternation is achieved by using a Halbach type arrangement, a diagram D2 of the magnetic fluxes of which is also illustrated in FIG. 6. In particular, according to such a type of layout, the elementary rings are magnetized alternately along the radial and the axial directions. Moreover, the direction of magnetization of each elementary ring is chosen so as to concentrate the magnetic field on the surface of the translation ring 51 facing the functional internal elements of the fixed body 22. In the example of the respective arrangement of the movable body 21 and the fixed body 22 shown in FIG. 4, such a magnetic field is concentrated on the outer surface of the translation ring 51.

The translation ring 51 has a width L1 corresponding to the extent thereof along the encoder axis X. The width L1 is formed by a sum of the widths of the elementary rings 51-1, 51-2, 51-3 forming the translation ring 51. The width of each elementary ring forms a notching pitch in translation.

According to one embodiment, the elementary rings have the same width. In such a case, the translation ring 51 has homogeneous notching pitch in translation.

In the example shown in FIG. 5, three elementary rings 51-1, 51-2, 51-3 are arranged successively along the encoder axis X. Among the elementary rings 51-1, 51-2, 51-3, the elementary ring 51-2 is arranged between the elementary rings 51-1, 51-3. The elementary rings 51-2 is then called central ring and the elementary rings 51-1, 51-3 are called peripheral rings. The central ring then has a central notch and the peripheral rings have peripheral notches.

Figure 7:
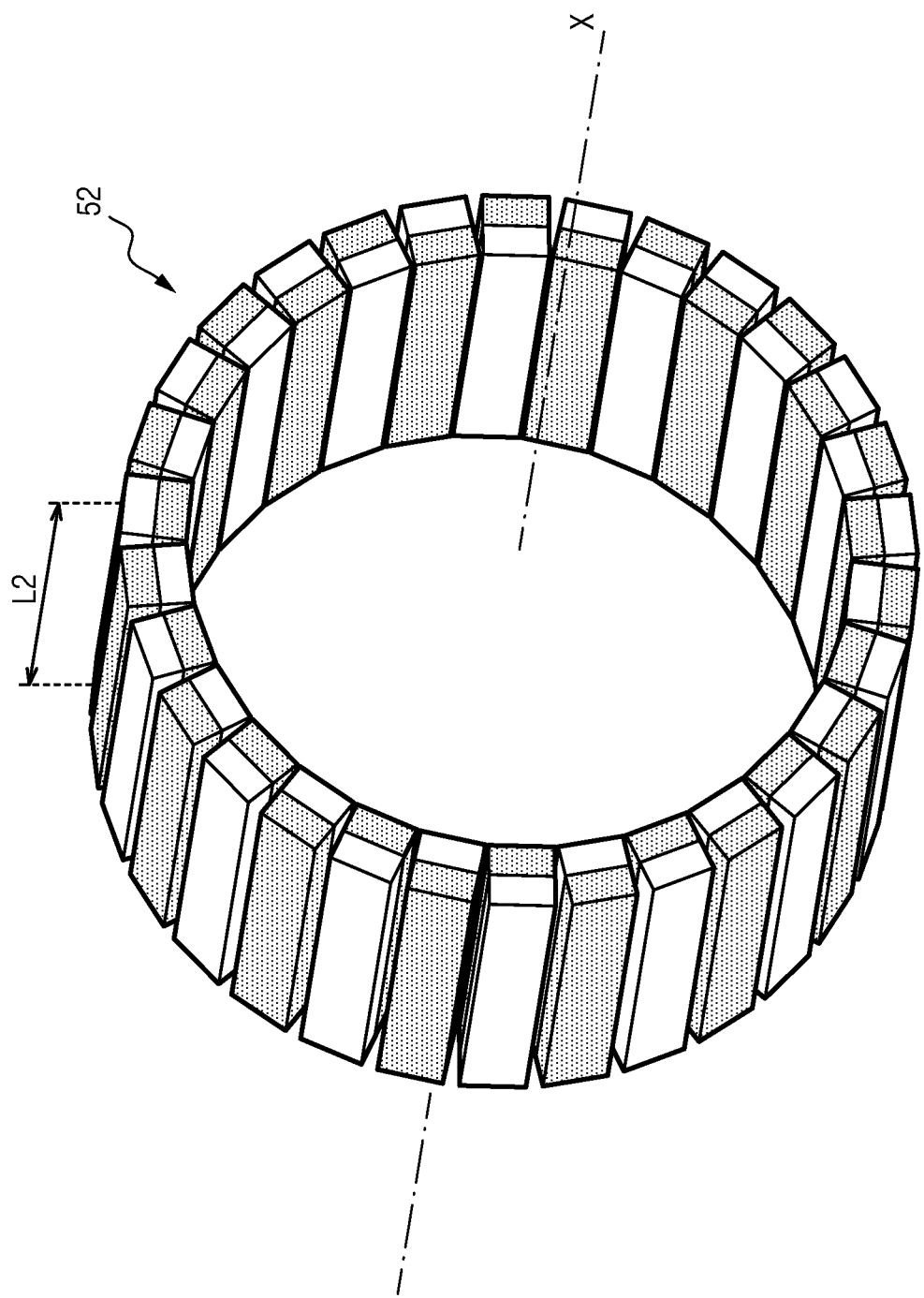
FIG. 7 is a schematic perspective view of the rotation ring shown in FIG. 4.

The rotation ring 52 is shown in more detail in FIG. 7. Thus, and as can be seen in FIG. 7, the rotation ring 52 also extends along the encoder axis X and has a width L2 corresponding to the longitudinal extent thereof. Advantageously, according to the invention, the width L2 is greater than the width L1 of the translation ring 51, in particular when the longitudinal extent of all the notching teeth (explained hereinbelow) are substantially identical. The rotation ring 52 has e.g. the same diameter as the translation ring 51.

The circumferential magnetic alternation of the rotation ring 52 is achieved by a particular layout of a plurality of elementary rings forming the rotation ring 52, each elementary part having e.g. a permanent magnet. Each elementary part can e.g. have a substantially parallelepiped shape which is elongated along the encoder axis X. Such shape can e.g. be slightly curved in order to form an arc of a circle around the axis encoder X. The elementary parts are arranged side by side, e.g. by bonding along the circumferential direction. The circumferential extent of each elementary piece forms a rotational notching pitch. The above is a homogeneous rotational notching pitch when all the elementary parts have the same circumferential extent. Like in the case of elementary rings, each elementary part is e.g. made of a single block or from a plurality of parallelepiped magnets or of magnets in the shape of an arc of a circle. Such an elementary part can also come from a "polymagnet" or a "programmable magnet" called Polymagnets®.

In the example shown in FIG. 7, the elementary parts have a radial magnetization and are arranged side by side so that the adjacent elementary parts are magnetized in opposite directions along the radial direction. Such layout of the elementary parts forms a pattern D3 of the magnetic fluxes illustrated in FIG. 8.

According to another example of possible layout, an axial magnetic alternation is achieved by using a Halbach type arrangement, a diagram D4 of the magnetic fluxes of which is also illustrated in FIG. 8. More particularly, according to such a type of arrangement, the elementary parts are magnetized alternately along the radial and the axial directions. Moreover, like in the previous case, the direction of magnetization of each elementary part is chosen so as to concentrate the magnetic field on the surface of the rotation ring 52 facing the functional internal elements of the fixed body 22. In the example of the respective arrangement of the movable body 21 and of the fixed body 22 shown in FIG. 4, such a magnetic field is concentrated on the outer surface of the rotation ring 52.

Returning to the description of FIG. 4, the functional internal elements of the fixed body 22 comprise a pair of magnetic translation detectors 61, also called first magnetic detectors, a pair of magnetic rotation detectors 62, also called second magnetic detectors, a plurality of translational notching teeth 71, also called first notching teeth, and a plurality of rotational notching teeth 72, also called second notching teeth. In the example of shown in FIG. 4, the elements 61, 62, 71, 72 are attached to an inner surface of the support 41 (not shown in FIG. 4) of the fixed body 22. Furthermore, as mentioned above, the elements 61, 62, 71, 72 are kept at a distance from the corresponding rings 51 and 52.

Figure 9:
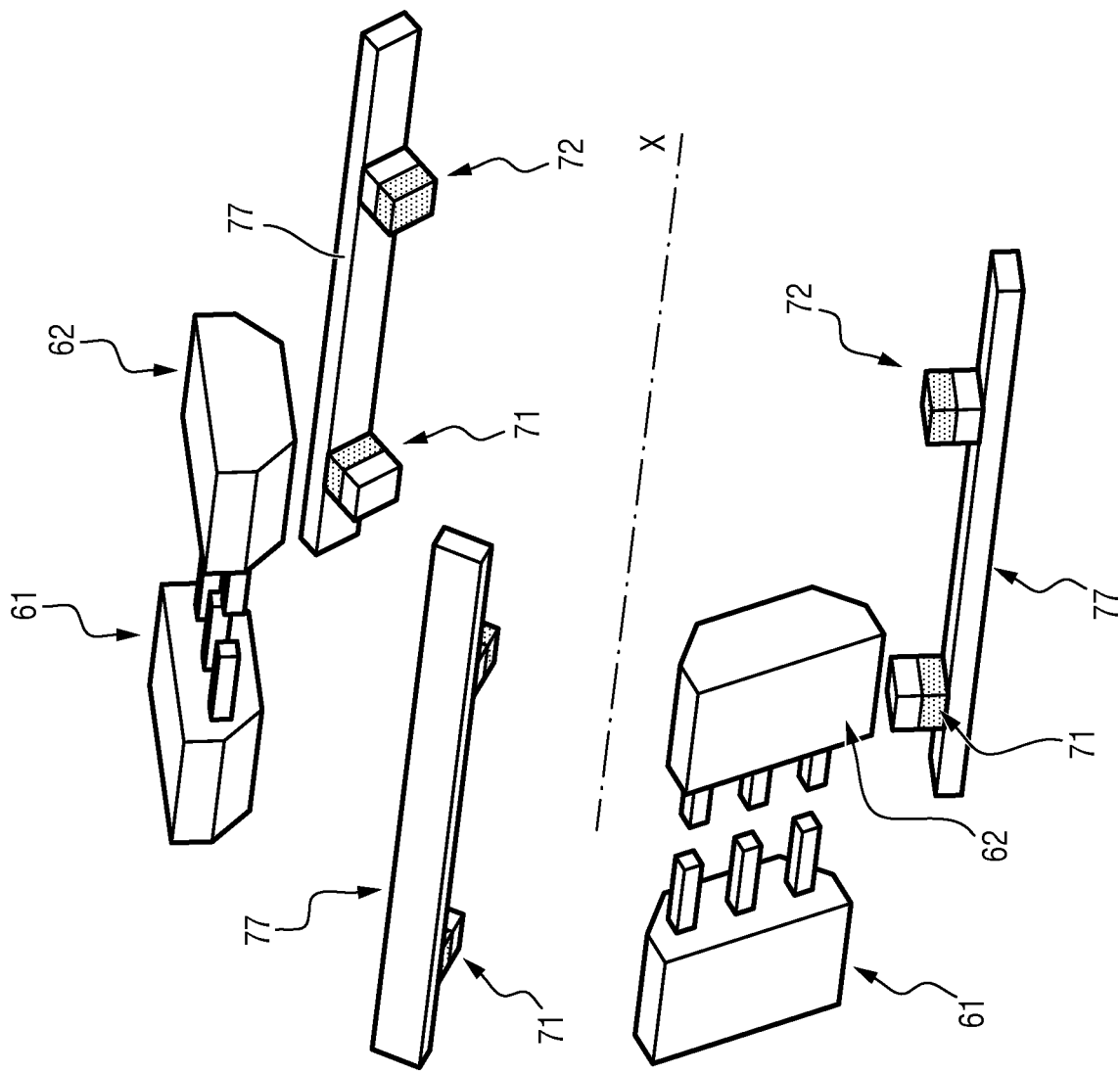
FIG. 9 is a schematic view of the notching teeth and the pairs of magnetic detectors shown in FIG. 4.

The elements 61, 62, 71, 72 can be seen in greater detail in FIG. 9.

More particularly, the pair of magnetic detectors of translation 61 is arranged opposite the translation ring 51 and quantifies the displacement of the magnetic ring 51 along the encoder axis X. In other words, the detectors 61 encode each displacement of the translation ring 51 along the encoder axis X by detecting changes in the magnetic flux due to the axial magnetic alternation of the elementary rings forming the translation ring 51. E.g., the detectors 61 are offset from each other by a fraction of the translational notching pitch defined by the translation ring 51.

The pair of magnetic detectors of rotation 62 is arranged facing the rotation ring 52. The detectors 62 quantify each rotary movement of the rotation ring 52 about the encoder axis X by detecting changes in the magnetic flux by means of the circumferential magnetic alternation implemented by the elementary parts forming the rotation ring 52. E.g., the magnetic detectors 62 are offset by a fraction of the rotational notching pitch defined by the rotation ring 52.

Each magnetic detector of each pair has e.g. a Hall effect sensor or a magnetoresistive sensor or a solenoid. Furthermore, each magnetic detector 61, 62 is connected to an external controller of the encoder 10 by cables 74 visible in FIG. 3.

According to an example of embodiment, the magnetic encoder 10 and in particular the fixed body 22, has a plurality of pairs of magnetic detectors for at least one of the directions of encoding. E.g., the detector 10 can comprise two or three pairs of magnetic detectors of translation and/or rotation. The doubling or even the tripling of magnetic detectors improves the reliability of the device.

Each translational notching tooth 71 is arranged opposite the translational ring 51. More particularly, each translational notching tooth 71 has a surface which is oriented towards the translation ring 51 and has a dimension less than or equal to the translational notching pitch. Such a surface has, e.g., a longitudinal extent which is less than or equal to the notching pitch of the ring 51. Furthermore, each translational notching tooth 71 is made of a ferromagnetic or a magnetic material such as stainless-steel series 400. Each translational notching tooth 71 is preferentially a magnet. Each translational notching tooth 71 is e.g. a parallelepiped magnet or a magnet in the shape of an arc of a circle. Such a magnet comes e.g. from a "polymagnet" or from a "programmable magnet" called Polymagnets®.

In the example shown in FIG. 4, when the translation ring 51 consists of a central elementary ring 51-2 and of two peripheral elementary rings 51-1 and 51-2, each translational notching tooth 71 defines a stable position wherein same is arranged opposite the central elementary ring 51-2. In order to ensure such a stable position, each translational notching tooth 71 has a magnetization in the opposite direction to the direction of the outer surface of the central elementary ring 51-2.

Each rotational notching tooth 72 is arranged opposite the rotation ring 52. Like in the previous case, each rotational notching tooth 72 has a surface oriented towards the rotation ring 52 with a dimension less than or equal to the dimension of the rotational notching pitch. Furthermore, the rotational notching tooth 72 is made of a ferromagnetic or a magnetic material such as stainless-steel series 400. Each rotational notching tooth 72 is preferentially a magnet. Each rotational notching tooth 72 is e.g. a parallelepiped magnet or a magnet in the shape of an arc of a circle. Such a magnet comes e.g. from a "polymagnet" or from a "programmable magnet" called Polymagnets®.

As illustrated in FIG. 9, the teeth associated with the different rings 51, 52 are advantageously linked to one another by a connecting piece 77. The connecting piece 77 is e.g. a magnetic or a ferromagnetic piece, and advantageously extends along the encoder axis X.

Moreover, in the example shown in FIG. 9, a plurality of notching teeth 71, 72 is associated with each of the rings 51, 52. In such case, at least two notching teeth 72 participate at the same time in the rotational notching, i.e. a magnetization force is applied at the same time to at least two rotational notching teeth 72. More particularly, in the example of said figure, three teeth are associated with each of the rings. Advantageously, according to the invention, when such a plurality of notching teeth is associated with a ring, the notching teeth are arranged equidistantly along the circumferential direction of the corresponding ring 51, 52. It should also be understood that a single notching tooth for each ring would be sufficient to provide a notching function along the corresponding direction.

Figure 10:
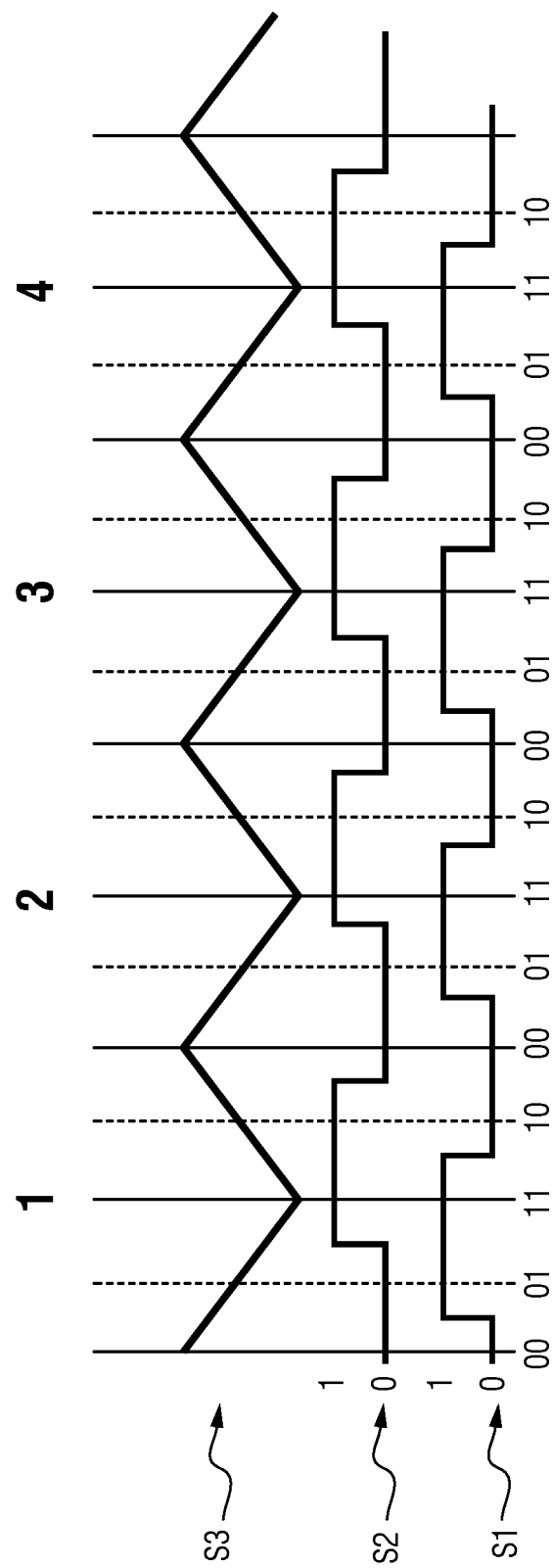
FIG. 10 is a diagram illustrating the operation, with a notching force, of a pair of magnetic detectors shown in FIG. 9.

FIG. 10 illustrates an encoding pattern created by a pair of magnetic detectors of translation 61 or of rotation 62. According to such pattern, one of the magnetic detectors of the pair delivers either a true or a false signal during the movement of the corresponding ring. The signal is denoted by the reference S1 in FIG. 10. The other detector delivers a signal S2 which is offset with respect to the signal S1 by a fraction of the notch pitch. The signal S2 is also composed of true and false values which then alternate with the movement of the corresponding ring along the corresponding direction. Finally, FIG. 10 also shows a plot S3 which corresponds to the notching force or torque provided by one or a plurality of notching teeth during the movement of the corresponding ring along the corresponding direction. The plot S3 is then also periodic.

Figure 11:
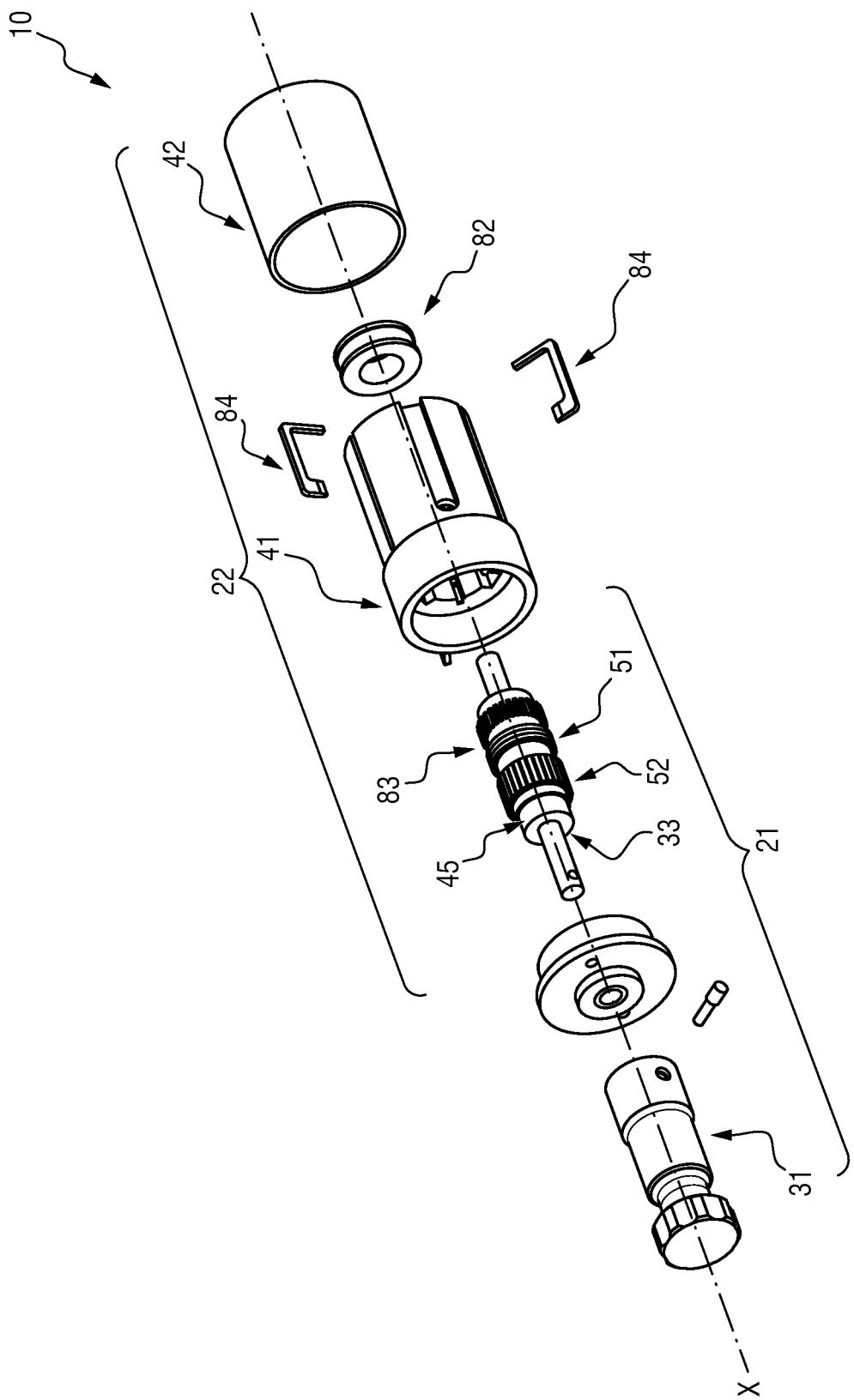
FIG. 11 is an exploded perspective view of the encoder shown in FIG. 1 wherein a supplementary notching controller was added.

FIG. 11 represents another example of embodiment of the incremental encoder according to the first embodiment. According to said example, the encoder 10 comprises a supplementary notching controller for more controlling the notching force or torque along at least one of the directions of encoding. The controller comprises in particular a magnetic coil 82 integrated in the fixed body 22 and a toothed wheel 83 integrated into the movable body 21. E.g., the coil 82 is mounted inside the support 41 and the toothed wheel 83 is mounted on a rotor 33 just like the rings 51 and 52 described hereinabove. E.g. the toothed wheel 83 is mounted along the same encoder axis X as the rings 51, 52.

The toothed wheel 83 is made of a ferromagnetic or a magnetic material and is intended for being arranged opposite the magnetic coil 82 when the rotor 33 is received inside the support 41. Like the rings 51, 52, the toothed wheel 83 is intended for being spaced from the coil 82.

The magnetic coil 82 is suitable for generating a magnetic field around the toothed wheel 83. The magnetic field is suitable for creating a notching during the movement, e.g. in rotation, for the button 31. Advantageously, the number of teeth of the toothed wheel 83 is equal to a multiple of the number of the rotational notches of the encoder 10. In a variant, the magnetic field is suitable for creating a notching during the translational movement of the button 31.

The part of the rotor 33 receiving the toothed wheel is in particular made of ferromagnetic or magnetic material. Moreover, according to certain embodiments, the fixed body 22 can be completed with one or a plurality of ferromagnetic or magnetic parts 84 for the magnetic closure with the magnetic coil 82.

According to a variant, the toothed wheel 83 is replaced by any other part made of magnetic or ferromagnetic material on which the magnetic coil 82 is apt to act. In certain cases, the movable body 21 can contain no such magnetic or ferromagnetic part. In such a case, the coil 82 is configured for acting directly on the shaft 45 which e.g., in this case, is made entirely of a magnetic or ferromagnetic material. As a further variant, the coil 82 is suitable for acting directly on at least one of the rings 51, 52. Thereby, by adapting the magnetic field created by the coil 82, the notching force or torque can be controlled according to at least one of the directions of encoding.

Second Embodiment

The encoder 110 according to a second embodiment will henceforth be explained with reference to FIGS. 12 to 16. The application of the encoder 110 is e.g. identical to the application of the encoder 10, as explained hereinabove.

Figure 12:
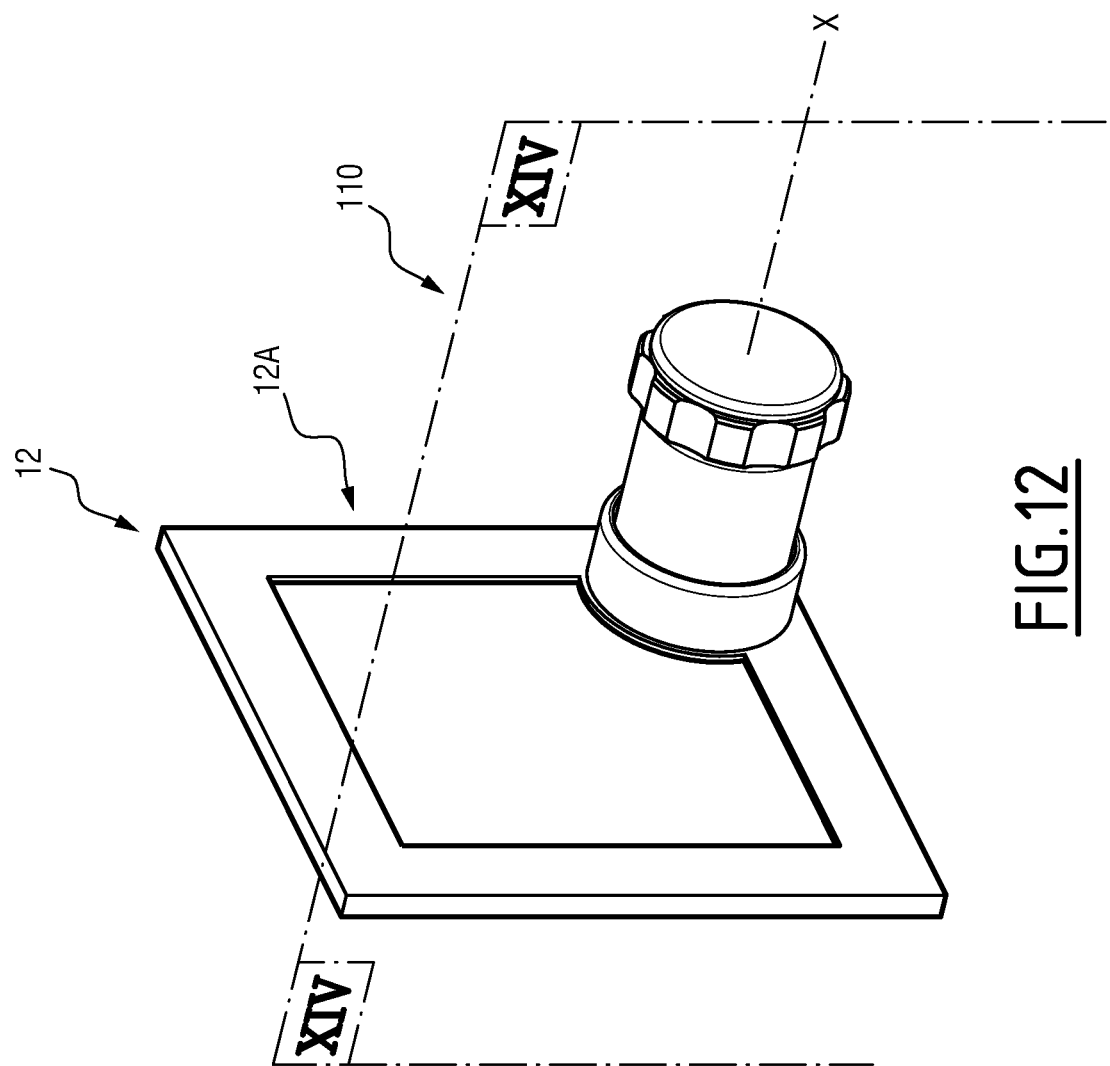
FIG. 12 is a schematic perspective view of an encoder according to a second embodiment of the invention, the encoder being attached to a panel forming an instrument panel while remaining in front of the panel.

The main difference of the encoder 110 according to the second embodiment consists in the manner of the arrangement thereof with respect to the panel 12. Indeed, as illustrated in FIG. 12, the encoder 110 according to the second embodiment is arranged entirely in the front part 12A of the panel 12.

Figure 13:
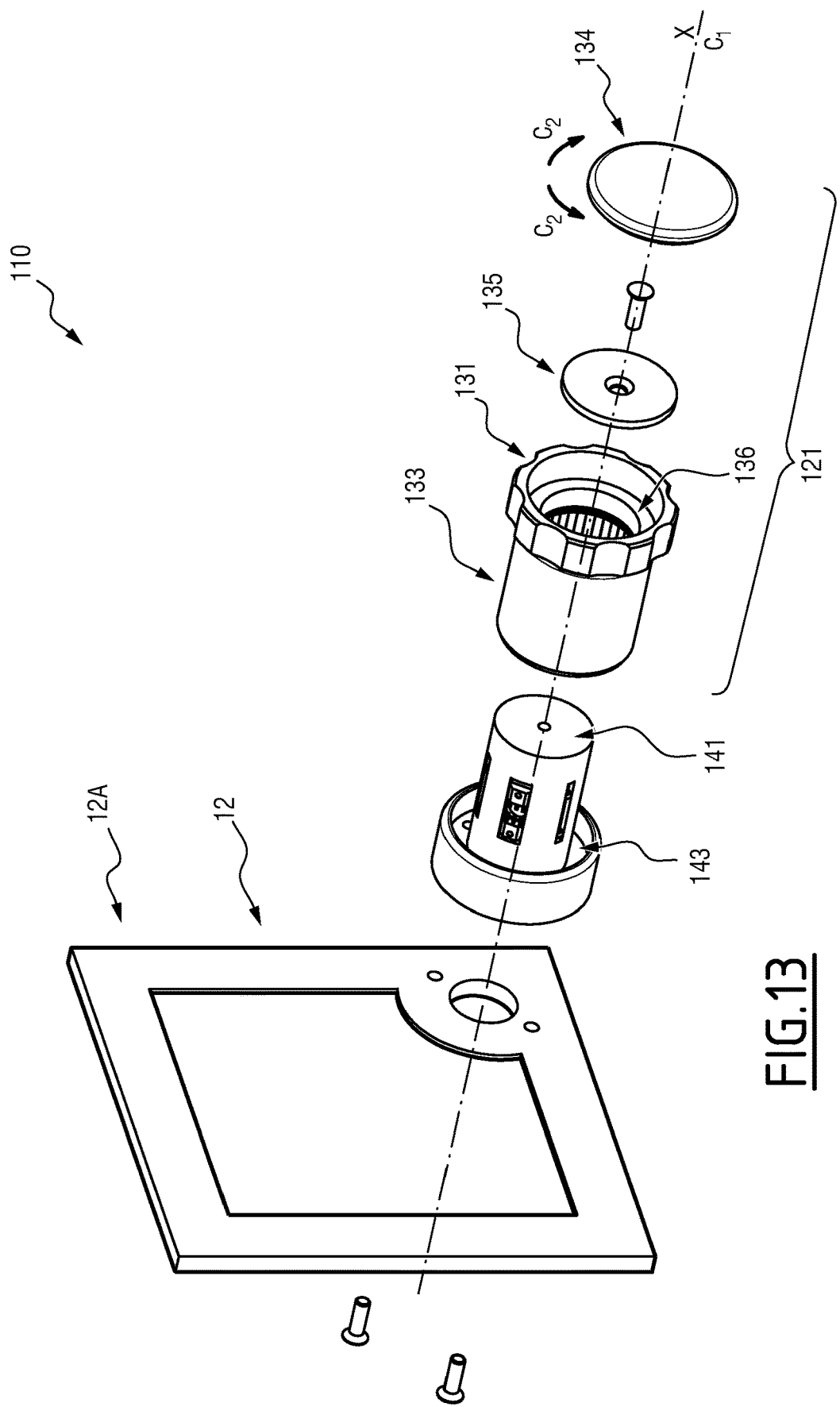
FIG. 13 is an exploded perspective view of the encoder shown in FIG. 12.

As illustrated in FIG. 13, just like the encoder 10 according to the first embodiment, the encoder 110 according to the second embodiment comprises a movable body 121, also called first body, and a fixed body 122, also called second body.

The fixed body 122 is attached e.g. directly to the front part 12A of the panel 12. Like in the previous case, the fixed body 122 comprises a support 141 receiving the functional internal elements of the fixed body 122 as will be explained thereafter in greater detail. The support 141 can further comprise a mechanical stop 143 integrated in one of the ends thereof.

Like in the previous case, the movable body 121 further comprises a button 131 and a rotor 133 which is e.g. rigidly attached to the button 131 arranged at the end thereof. The same end of the rotor 133 is e.g. closed by a cover 134 having a surface oriented towards the operator. The cover 134 is linked to the rotor 133. A washer 135 is rigidly attached to the fixed body 122 at the end thereof. The washer 135 can have a mechanical stop during the rotation or the translation of the movable body 121. The mechanical stop can be damped via a return spring or an elastomer part (example of material: EPDM). Moreover, such stop can also be magnetic. In such case, the stop can be produced by placing a magnet rigidly attached to the fixed body, repulsive and opposite with regard to a magnet rigidly attached to the movable body. The magnetic stop is intrinsically damped. Such magnetic stop can be independent or be part of one of the rings 51, 52, 151 or 152 (in a logic of optimization of the number of parts). E.g. in the case of a ring of the movable body using a Halbach arrangement, illustrated in FIG. 6, a magnet of the fixed body can be placed so as to be repulsive and opposite the end of the ring having, locally, an axial or a circumferential magnetization. Furthermore, at each of the ends thereof, the rotor 133 can have bearings 136 intended for cooperating with the fixed body 122 in order to ensure the movement of the movable body 121 along each of the directions of encoding, namely, a first direction of encoding C1 corresponding to the direction of translation along the encoder axis X and a second direction of encoding C2 corresponding to the direction of rotation about the encoder axis X, in the example of the figures.

Figure 14:
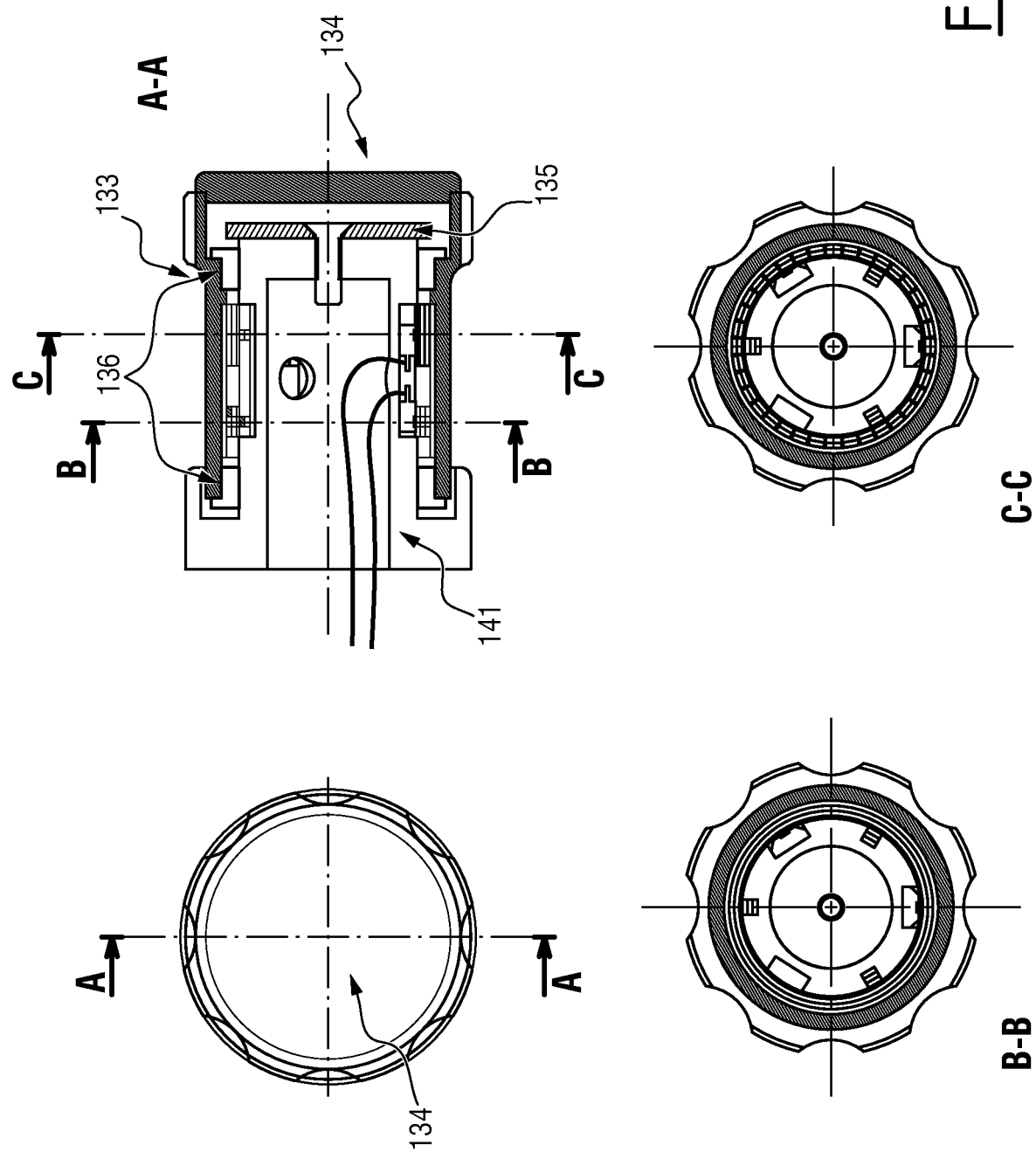
FIG. 14 shows a partial view of a section along the longitudinal plane XIV of FIG. 12 and of three other sections along the encoder axis shown in FIG. 12.

Contrary to the preceding case, the rotor 133 is intended for incorporating the fixed body 122 at least partially. In other words, the rotor 133 is intended for being arranged around the support 141 as can be seen in FIG. 14.

Figure 15:
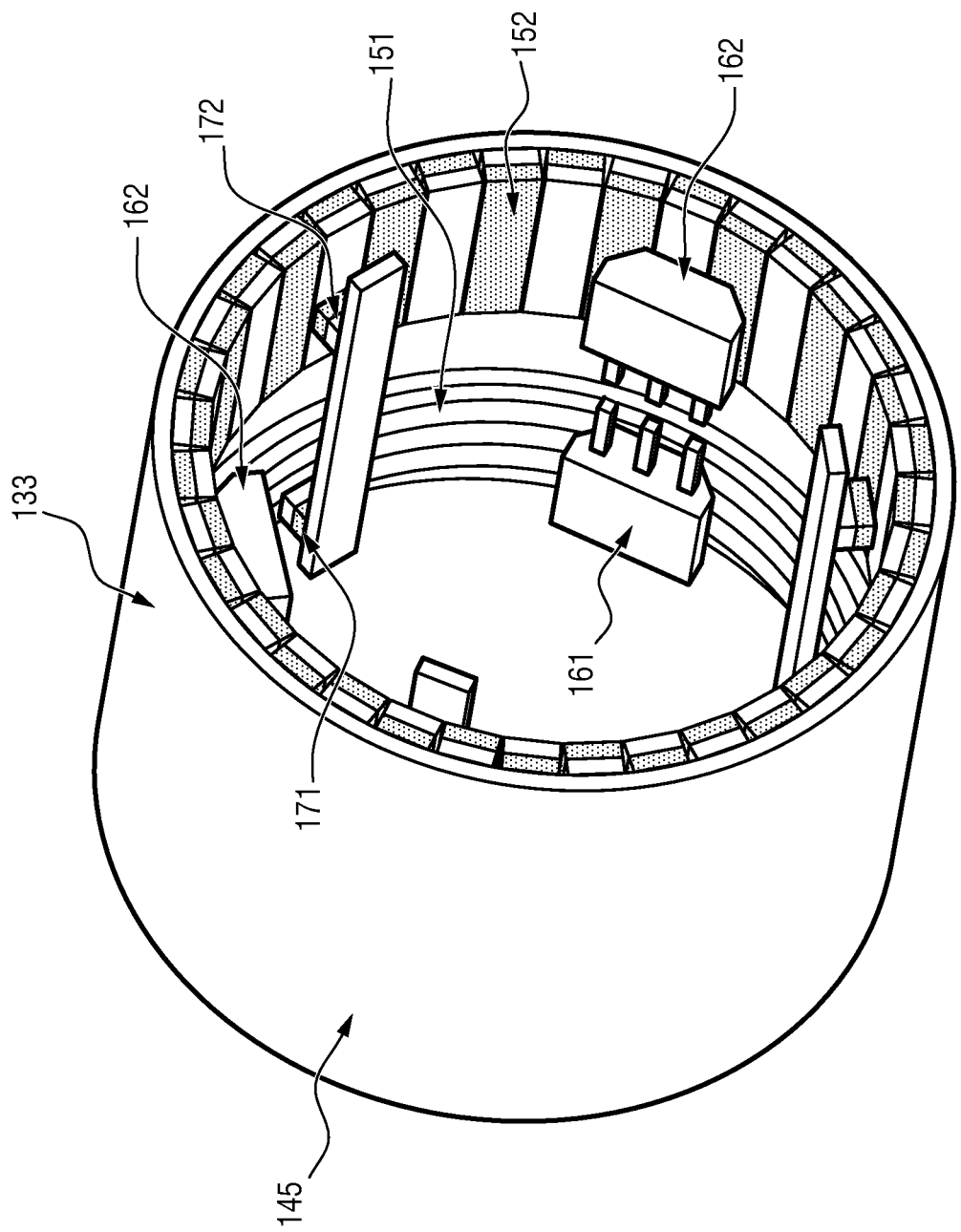
FIG. 15 is a schematic perspective view of an example of layout of the functional internal elements of the fixed body and of the movable body of the encoder shown in FIG. 12.

As illustrated in FIG. 15, just like in the previous case, the movable body 121 comprises a translation ring 151, also called first ring, and a rotation ring 152, also called second ring. The rings are similar to the rings 51, 52, respectively, as described above. Unlike the previous case, the rings 151, 152 according to the second embodiment are arranged on an inner surface of the rotor 133 which then has a hollow rotary shaft according to the example of said figure. Each of the rings 151, 152 is attached onto the shaft 145 along the encoder axis X and stays spaced from the other ring 151, 152.

Also, in a similar manner to the preceding case, the fixed body 122 comprises a plurality of pairs of magnetic detectors 161, 162 and a plurality of notching teeth 171, 172. More particularly, as in the previous case, the pairs of magnetic detectors 161, 162 comprise at least one pair of magnetic detectors of translation 161 arranged opposite the translation ring 151 and one pair of magnetic detectors of rotation 162 arranged opposite the rotation ring 152. Similarly, the notching teeth 171, 172 comprise at least one translational notching tooth 171 arranged opposite the translation ring 151 and one rotational notching tooth 172 arranged opposite the rotation ring 152. Advantageously, in a manner analogous to the preceding case, a plurality of notching teeth 171, 172 is associated with each of the rings 151, 152. In such case, at least two notching teeth 172 participate at the same time in the rotational notching, i.e. a magnetization force is applied at the same time to at least two rotational notching teeth 172.

Unlike the previous case, the functional internal elements 161, 162, 171, 172 of the fixed body 122 of the encoder 110 according to the second embodiment are arranged on an external surface of the support 141. Thereby, according to said embodiment, such elements are arranged facing the inner surfaces of the corresponding rings 151, 152. In other words, according to this embodiment, the functional internal elements of the fixed body 122 are received inside the rings 151, 152, while remaining at a distance from them. The operation and the respective arrangement of these internal elements 161, 162, 171, 172 are similar to those described above in relation to the first embodiment.

Finally, with reference to FIG. 16, the button 131 of the movable body 121 of the encoder 110 according to the second embodiment can comprise at least one functional element chosen from the list comprising:
an element of visual feedback;
a presence sensor;
a haptic actuator.

In the example shown in FIG. 16, an element of visual feedback 190 is integrated on the surface 134 of the button 131. The element of visual feedback 190 can e.g. comprise an indicator indicating e.g. the function of the encoder 110 or an annunciator panel indicating the validation of the control or any other ambient light.

The ambient light can e.g. be connected to the rest of the cockpit, for creating an harmony for improving the aesthetic appearance of the button 131 of the encoder 110. Indeed, the luminous indication in the event of an emergency or turbulence can be an asset from the point of view of the safety of the aircraft. Such lighting can be connected and synchronized with the rest of the cockpit. In such case, the light could change color depending on the context during the flight e.g. red flashing in emergency situations.

When the functional element comprises a presence sensor, same can be integrated into the button 131 for activating additional functions and/or for detecting finger positions on the button. E.g. the function of the encoder 110 can be modified according to the number of fingers placed on the surface 134.

When the functional element comprises a haptic actuator, the latter is preferentially placed at the end of the button 131 so as to improve the haptic sensation felt by the user. Same can have a piezoelectric actuator or an unbalanced vibration motor preferentially rigidly attached to the fixed body 122. The actuator can also be an electromagnetic actuator and act between the fixed body 122 and the movable body 121. The electromagnetic actuator can use a winding or a coil rigidly attached to the fixed body 122 which generates a magnetic field which attracts or repels a ferromagnetic or magnetic part along the encoder axis X. Such latter part can be either independent or be a part of the rings 151, 152.

As can be seen in FIG. 16, one or a plurality of the functional elements can be arranged inside the rotor 133 and the support 141. In such a case, the cables 174 connecting such functional elements can extend inside the rotor 133 to an external controller.

Of course, at least one of the aforementioned functional elements can also be arranged in the encoder 10 according to a first embodiment. Moreover, a notch controller similar to same described in relation to the first embodiment can also be arranged in the encoder 110 according to the second embodiment. It is also clear that it is possible to arrange the encoder 10 as described in relation to the first embodiment entirely in the front part 12A of the panel 12. It is also possible to arrange the encoder 110 as described in relation to the second embodiment partly in the rear part 12B and partly in the front part 12A of the panel 12. Finally, it should be understood that the notion of a first body with all associated elements can be applied to a fixed body and the notion of a second body with all associated elements can be applied to a movable body.

The invention claimed is:

1. An incremental magnetic encoder defining an encoder axis and comprising a fixed body and a movable body movable with respect to the fixed body along at least a first direction of encoding corresponding to a translation along the encoder axis according to a predetermined translation travel length, the movable body being movable with respect to the fixed body further in a second direction of encoding perpendicular to the first direction of encoding and corresponding to rotation about the encoder axis;
   one of the bodies, called first body, comprising:
      a first ring extending along a first longitudinal direction coinciding with the encoder axis and a first circumferential direction perpendicular to the first longitudinal direction, the first longitudinal direction corresponding to the first direction of encoding, the first ring defining a magnetic alternation along the first direction of encoding;
      a second ring extending along a second longitudinal direction coinciding with the encoder axis and a second circumferential direction perpendicular to the second longitudinal direction, the second circumferential direction corresponding to the second direction of encoding, the second ring defining a magnetic alternation along the second direction of encoding;
   the other body, called second body, comprising:
      at least one first notching tooth made of ferromagnetic or magnetic material arranged opposite the first ring so as to create a notching during a movement of the movable body along the first direction of encoding;
      a first pair of magnetic detectors arranged opposite the first ring and configured for quantifying each movement of the movable body along the first direction of encoding;
      at least one second notching tooth made of ferromagnetic or magnetic material arranged opposite the second ring so as to create a notching during a movement of the movable body along the second direction of encoding; and
      a second pair of magnetic detectors arranged opposite the second ring and configured for quantifying each movement of the movable body along the second direction of encoding.

2. The encoder according to claim 1, wherein the at least one first notching tooth and at least one second notching tooth are rigidly connected to one another by a connecting piece.

3. The encoder according to claim 2, wherein the longitudinal extent of the second ring is selected such that the magnetic field seen by the at least one second notching tooth and by the second pair of magnetic sensors is substantially constant over the entire length of travel in translation.

4. The encoder according to claim 2, wherein the connecting piece is made of ferromagnetic or magnetic material.

5. The encoder according to claim 1, wherein:
   the first ring defines at least one central notch and two peripheral notches; and
   a position which is stable in translation being defined when the at least one first notching tooth is arranged opposite the central notch.

6. The encoder according to claim 1, wherein the magnetic alternation of the first ring and the second ring defines a constant notching pitch.

7. The encoder according to claim 6, wherein the surface of the at least one first notching tooth and the at least one second notching tooth has an extent less than or equal to the notching pitch of the corresponding ring.

8. The encoder according to claim 6, wherein the magnetic detectors of a same pair of detectors are offset from each other by a fraction of the notching pitch of the corresponding ring.

9. The encoder according to claim 1, wherein the second body comprises at least one ring, a plurality of notching teeth made of ferromagnetic or magnetic material arranged opposite the at least one ring so as to create a notching during a movement of the movable body along the corresponding direction of encoding.

10. The encoder according to claim 9, wherein said notching teeth are distributed equidistantly along the corresponding circumferential direction.

11. The encoder according to claim 1, further comprising a travel stop for the first direction of encoding and the second direction of encoding.

12. The encoder according to claim 1, wherein the first body is the movable body and the second body is the fixed body.

13. The encoder according to claim 1, wherein:
   the fixed body is intended for being attached in front of a panel forming an instrument panel;
   the fixed body is at least partially sheathed by the movable body.

14. The encoder according to claim 1, wherein:
   the fixed body is intended for being attached behind a panel forming an instrument panel;
   the fixed body sheathes at least partially the movable body.

15. The encoder according to claim 1, further comprising a button intended for being oriented towards an operator;
   said button comprising at least one functional element selected from the list comprising:
      an element of visual feedback;
      a presence sensor;
      a haptic actuator.

16. The encoder according to claim 1, further comprising a supplementary notching controller comprising an electromagnetic coil rigidly attached to one of the bodies and configured for acting on the or each notching tooth and/or a ferromagnetic or magnetic element.

* * * * *